United States Patent [19]
Dowell

[11] 4,001,499
[45] Jan. 4, 1977

[54] DISPLAY SYSTEMS
[75] Inventor: Kenneth J. Dowell, Edgware, England
[73] Assignee: Smiths Industries Limited, London, England
[22] Filed: Mar. 26, 1975
[21] Appl. No.: 562,365
[30] Foreign Application Priority Data
Mar. 29, 1974 United Kingdom ............ 14073/74
[52] U.S. Cl. .......................... 358/93; 178/DIG. 20; 343/6 TV; 358/109
[51] Int. Cl.² ........................................ H04N 7/02
[58] Field of Search ............... 178/DIG. 20, 6, 6.8; 343/6 TV; 340/27 R

[56] References Cited
UNITED STATES PATENTS
2,950,340  8/1960  Compton et al. ...................... 178/6
3,885,095  5/1975  Wolfson ............................ 178/7.88
3,932,861  1/1976  Bull ............................... 340/324 AD Primary Examiner—Robert L. Griffin
Assistant Examiner—Edward L. Coles
Attorney, Agent, or Firm—Pollock, Vande Sande & Priddy

[57] ABSTRACT

In a head-up display system video signals derived by a television (or infra-red) camera which is mounted on the aircraft nose to view substantially the same scene as viewed by the pilot along his line-of-sight through the partially-transparent reflector of the head-up display system, are mixed with the video signals which are supplied by a waveform generator in accordance with aircraft-attitude and weapon-aiming symbology that is used for projection onto the reflector. The combined signals, representing the external scene with the symbology superimposed, are supplied to a video-tape recorder for subsequent, or immediate, replay by a television monitor in the aircraft or via the pilot's head-up display unit, and are also supplied to a transmitter to enable recording and display to be carried out at a ground station. A second head-up display unit having its own waveform generator, is provided in the aircraft for use by an instructor during pilot training, and a mixer associated with this is supplied with the combined signals or with the camera signals alone. The combined signals may be used to intensify the view through the reflector of a pilot's head-up display unit used for a military mission, so as to ensure more ready identification of a target.

7 Claims, 4 Drawing Figures

DISPLAY SYSTEMS

This invention relates to display systems.

The invention is particularly concerned with head-up display systems for use in aircraft, that is to say, with systems of the kind in which a display is generated for projection into a partially-transparent reflector in a line-of-sight from the aircraft so as to provide an image of the display against the background of the external scene through the aircraft windscreen. The display is normally provided by a cathode-ray tube and involves symbols that in the image seen in the partially-transparent reflector, are positioned against the background of the external scene to give indication of such factors as aircraft attitude and flight-path.

Instruction in the correct use of a head-up display by an aircraft pilot (and of the information it presents) is an important part of his training. More particularly, there is a need to provide a record of the view the pilot has of the projected display superimposed on the outside scene, so that the information and circumstances that confront him, and his actions and reactions in response to them, can be presented for later commment and analysis. To this end it is present practice to record the pilot's view on photographic film using a cine camera. There are, however, certain serious disadvantages associated with this, not least of which are the difficulty of achieving a suitable and safe location for the camera and the need to await development of the film before replay can take place following the training exercise.

It is one of the objects of the present invention to provide a head-up display system in which the above disadvantages can be generally overcome.

According to the present invention a head-up display system for an aircraft, includes means for supplying video signals in accordance with substantially the same external scene as that viewed along the line-of-sight through the partially-transparent reflector of the system, and means for combining these video signals with video signals that are derived in accordance with the display which is generated within the system for projection onto the reflector, so that the combined video signals correspond to a view through the reflector with the said generated display superimposed thereon.

A recording of the combined video signals may be readily made for subsequent, or immediate replay. The signals, as recorded or otherwise, may be supplied to a display device in the aircraft. More particularly, arrangement may be made for a display of the combined video signals to be projected into the line-of-sight of the pilot or of another crew member of the aircraft.

The video signals in accordance with the external scene may be provided by a television camera. This may conveniently be mounted at the nose of the aircraft or elsewhere, in particular on the fuselage or a wing of the aircraft, outside the pilot's cockpit. Nonetheless, it may, like the cine camera of present practice in pilot training, be mounted within the cockpit; since the television camera is not required to view through the reflector, there is greater flexibility of choice of its possible location in the cockpit and so the special problems associated with the mounting of the cine camera need not apply.

Although the present invention has been referred to above more particularly in relation to training of aircraft pilots, its application is not limited to this. It may find application in normal military-aircraft missions or civil-aircraft operations.

A head-up display system in accordance with the invention, for use in a military aircraft, will now be described by way of example, with reference to the accompanying drawings, in which.

Figure 1:
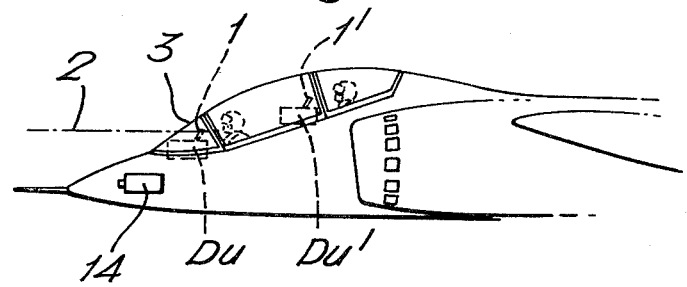
FIG. 1 is illustrative of the installation of the head-up display system in the aircraft.
Figure 2:
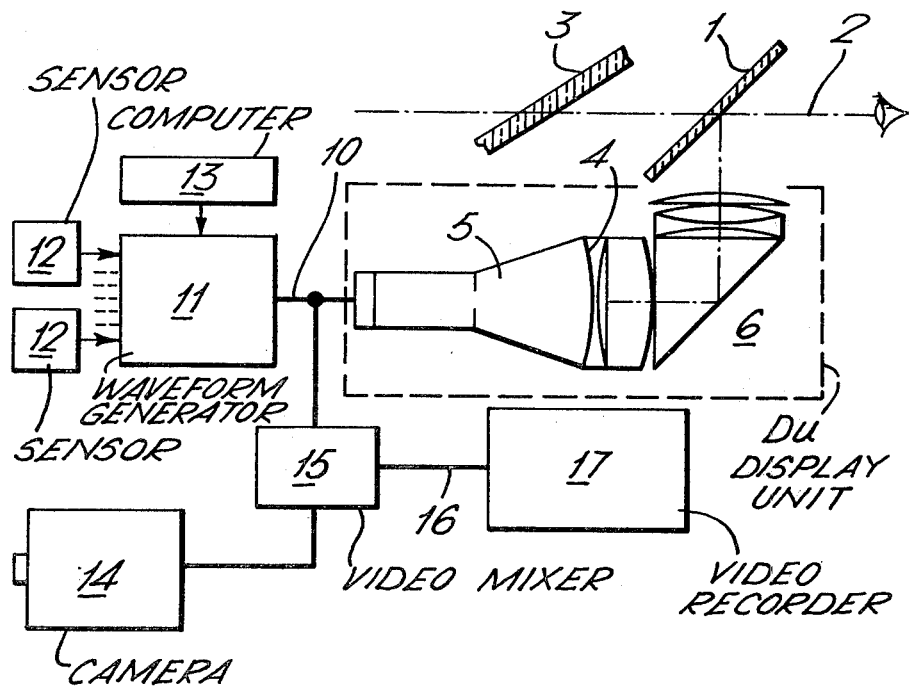
FIG. 2 is a schematic representation of the head-up display system.

Referring to FIGS. 1 and 2, a partially-transparent reflector 1 of a display unit Du is mounted in front of the pilot within the cockpit of the aircraft and in his line-of-sight 2 through the aircraft-windscreen 3. A display of flight and weapon-aiming information is projected on the reflector 1 which is inclined to the line-of-sight 2 so that the pilot sees the display image in the reflector 2 against the background of the external scene through the windscreen 3. As shown in FIG. 2, the display is projected from the screen 4 of a cathode-ray tube 5 within the display unit Du by an optical system 6 that serves to focus the image seen by the pilot, substantially at infinity.

Figure 3:
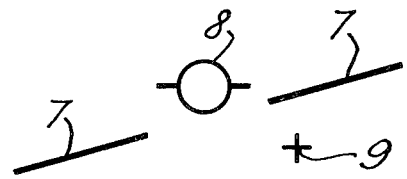
FIG. 3 is illustrative of symbology involved in the display provided by the system of FIG. 2.

The information displayed includes, as illustrated in FIG. 3, analogue presentation of aircraft attitude involving an horizon symbol 7 (in the form of two spaced and aligned bars) and a flight-vector symbol 8 (in the form of a circle with short laterally-extending arms). The flight-vector symbol 8 remains stationary on the screen 4 of the cathode-ray tube 5 and so its image remains stationary in the pilot's field of view through the reflector 1. The horizon symbol 7, however, moves so as to be seen by the pilot to be displaced angularly, and also up and down, relative to the symbol 8, in accordance with bank and pitching movements respectively of the aircraft. The weapon-aiming information on the other hand, and as illustrated in FIG. 3, involves a cross symbol 9 that is moved in the display on the screen 4 so as to be seen by the pilot in image against the external scene through the windscreen 3, and to denote a desired line of aim of the aircraft weapon-system (or a selected part of it). The pilot's task is to manoeuvre the aircraft to bring the symbol 9 within the flight-vector symbol 8 and accordingly align the aircraft appropriately for firing of the weapon system.

The electric time-base and video signals required to produce the display of flight and weapon-aiming information on the screen 4, are supplied to the cathode-ray tube 5 via a multi-lead cable 10 by a waveform generator 11. The waveform generator 11 generates the relevant video signals in accordance with signals it receives from appropriate attitude, and other, sensors 12 and a weapon-aiming, or other, computer 13. In this respect, it is to be understood that the display as generated and embodied in the video signals supplied via the cable 10 to the cathode-ray tube 5, may embrace a wider variety of information than that involved in the basic form illustrated in FIG. 3. Any of the information may be presented in digital or analogue form, or both.

To the extent that the system shown in FIGS. 1 and 2 has so far been described, it constitutes a head-up display system of conventional form used in military aircraft. The correct use of such a display system, in for example an attack mission, is an important part of a military pilot's training. It is necessary during his training program to record what is seen by him as he executes the mission. More particularly, it is necessary to provide a record of the view he has of the generated display superimposed on the outside scene, so that the information and circumstances that confront him, and his actions and reactions in response to them, can be presented for later comment and analysis. To this end, it is at present the practice to record the pilot's view on photographic film using a cine camera that is located just in front of the pilot to receive an image of what he sees from a small periscope that looks into the reflector 1 along the line-of-sight 2. There are, however, certain serious disadvantages in this: firstly there is the difficulty of accommodating the cine camera in the usually-cramped cockpit; secondly there is the danger that location of the camera just in front of pilot may cause injury to him in the event of the necessity for his ejection from the aircraft; and thirdly there is the delay and general inconvenience that is caused by the necessity to await development of the cine film following the recorded training mission.

The above disadvantages can be readily overcome with the system of the present invention. In this respect there is with the system of FIGS. 1 and 2, no use of a camera or other equipment in the aircraft cockpit, and furthermore the record is made in an immediately-replayable form. More particularly, the system uses a television camera 14 that as illustrated in FIG. 1 is mounted on, or in, the nose of the aircraft (it may be mounted elsewhere, for example on the wing) so as to view a scene that to all intents and purposes is the same as that of the outside world seen by the pilot along the line-of-sight 2. The time-base and video signals derived by the camera 14 are supplied to a video-mixer unit 15 that also receives the signals supplied to the cathode-ray tube 5 via the cable 10. The two sets of video signals are superimposed on one another by the unit 15 with appropriate synchronization to the camera time-base signal. The latter signal and the combined video signals are then supplied via a multi-lead cable 16 for tele-recording by a video recorder 17. The recorder 17 provides from these combined signals a video-tape recording corresponding in all essential respects to the display-superimposed view of the external scene which is being viewed by the pilot through the reflector 1. This recording can be readily removed from the recorder 17 for immediate replay as soon as the pilot has returned from the training mission and for analysis while the mission is still fresh in his mind.

Figure 4:
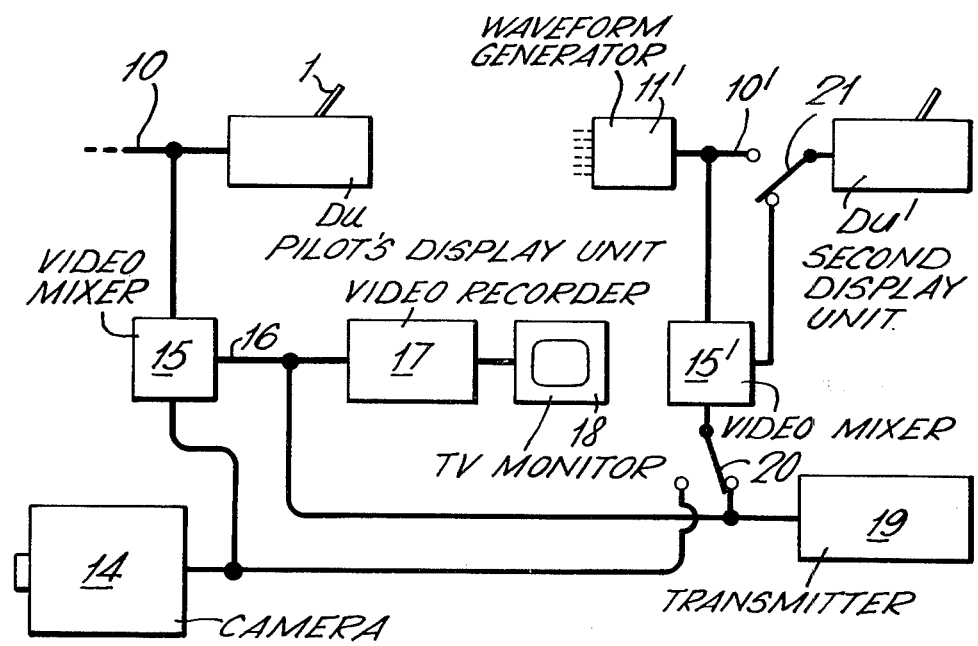
FIG. 4 is a schematic representation that serves to illustrate modification and extension of the head-up display system of FIG. 2.

The system may include, as illustrated in FIG. 4, a television monitor 18 so as to enable the video-tape recording to be replayed directly from the recorder 17. In this respect also, or alternatively, it may be arranged that the recording is replayed via the cable 16 and the video-mixer unit 15 to the display unit Du for projection of the replay into the line-of-sight 2 of the pilot so that he can re-enact the mission in simulation.

It may be found of advantage in certain circumstances to locate the television monitor 18 in a position within the aircraft where it can be readily viewed by the instructor during flight, and to apply the combined video signals to the monitor 18 as they are being derived by the video-mixer unit 15, so that instruction can be given during the course of the mission. These combined video signals on the cable 16 may also, or alternatively, be applied as illustrated in FIG. 4, to a transmitter 19 within the aircraft so as to enable viewing or recording, or both, to be carried out at a ground receiving-station. Furthermore, as illustrated in FIG. 4 (and in lesser detail in FIG. 1) these video signals may be supplied for display on the reflector 1' of a second display unit Du'. The second display unit Du', which in this context is for use by the instructor and which is shown with its own waveform generator 11', is the same as the pilot's display unit Du, and the signals from the cable 16 are supplied to it via a two-position switch 20, a video-mixer unit 15' and a two-position switch 21. The unit 15', which corresponds to the unit 15, combines the signals supplied via the switch 20 from the cable 16, with those on the lead 10' from the waveform generator 11', and supplies the result via the switch 21 to the unit Du'. The instructor, by changing over the setting of the switch 20, may select for combination with the signals from the waveform generator 11' the video signals from the camera 14 directly. Furthermore by changing over the setting of the switch 21, he may select for projection the display generated by the waveform generator 11' alone.

Although the system described has been referred to specifically in the role of training, it has application also in normal military and civil aircraft operation. More especially, the pilot of a military aircraft may be provided with a display unit having facilities corresponding to those of the second display unit Du' of FIG. 4. In particular, there may be a switch provided corresponding to the switch 21, for selecting for projection either the generated display alone or the combination of it with the scene viewed by a camera corresponding to the camera 14. The image of the scene viewed by the camera may be used in the latter respect to intensify the view obtained through the reflector of the pilot's display-unit so as to enable, for example, more ready identification of a target and any necessary adjustments of a marker (such as the symbol 9 of FIG. 3) in the display.

The camera 14 may be a conventional television camera but may be specially adapted for response to low-light conditions. As an alternative, the camera 14 may be an infra-red camera producing video signals in accordance with infra-red radiation received from the external scene viewed, or it may even be a forward-looking radar device. Watever the nature of the camera 14 however, there is the possibility that since it is at a spaced location from the display unit, it will be subject to vibrations that differ from those exhibited in the display presented to the pilot to such an extent that significant errors in registration between the camera-produced and display images will arise in the video-signal mixing. Steps to avoid such errors may be taken, and in this respect, for example, accelerometers may be mounted with the camera to provide signals in accordance with its angular movement, such signals being then processed electronically to derive compensatory signals for injection into the deflection circuits of the electronic scanning system of the camera.

The camera will normally involve a raster scan, whereas the waveform generator used with the display unit may operate using cursive display techniques. In such circumstances it will be necessary to make provision for appropriate scan conversion in the system before the video signals from the two sources are mixed.

I claim:

1. In a head-up display system which is for use in a aircraft and which includes a partially-transparent reflector for mounting in the line-of-sight of the pilot of the aircraft so that the pilot's view of a scene external to the aircraft is along said line-of-sight through said reflector, means for generating electric video signals in accordance with a display for presentation to the pilot, displaying means, and signal-supply means for supplying said electric video signals to said displaying means, said displaying means responding to said electric video signals supplied thereto by said signal-supply means to project an image of said display onto said reflector so as to present said generated-display image in said line-of-sight against the background of the said external scene through said reflector, the improvement wherein the system also includes further electric signal-generating means for generating further electric video signals in accordance with a scene viewed thereby, means mounting the said further electric signal-generating means to view substantially the same external scene as viewed by the pilot along said line-of-sight through said reflector, said mounting means mounting said further signal-generating means out of said line-of-sight to view said scene apart from said reflector whereby said further electric video signals generated by said further electric signal-generating means represent said external scene devoid of said generated-display image, signal-combining means responsive both to the said further video signals generated by said further signal-generating means and to the said first-mentioned video signals supplied to said displaying means by the first-mentioned signal-supply means, said signal-combining means combining the said further and first-mentioned electric video signals with one another to derive combined electric video signals corresponding to said external scene having the said generated display superimposed thereon, and electric video-signal recording means for recording utilizing said combined video signals for subsequent playback reproduction.

2. A head-up display system according to claim 1 wherein said further electric signal-generating means for supplying the said further electric video signals is a television camera.

3. A head-up display system according to claim 1 wherein said further electric signal-generating means for supplying the said further electric video signals is an infra-red camera.

4. In an aircraft, a head-up display system comprising a partially-transparent reflector located in a line-of-sight from the aircraft, means to supply electric video signals in accordance with a display of symbology generated for presentation in said line-of-sight, displaying means responsive to said electric video signals supplied by said supply means to project said symbology display onto said partially-transparent reflector so as to present said symbology display in said line-of-sight through said reflector, electronic camera means, means mounting said camera means spaced from said reflector out of said line-of-sight to view from the aircraft a scene substantially the same as that viewable along said line-of-sight through said reflector, said camera means being responsive to the scene viewed thereby to supply further electric video signals in accordance with said scene, means for mixing the further and first-mentioned electric video signals with one another to derive combined electric video signals corresponding to said scene having the said generated symbology-display superimposed thereon, and video-signal recording means for recording the combined video signals for subsequent playback reproduction.

5. A head-up display system according to claim 4 wherein the said electronic camera means is a television camera.

6. A head-up display system according to claim 4 wherein the said mounting means is means mounting said camera means at the nose of the aircraft.

7. A head-up display system according to claim 4 including a transmitter for transmitting the said combined electric video signals from the aircraft.

* * * * *